United States Patent Office

2,728,751
Patented Dec. 27, 1955

---

2,728,751

LONG CHAIN ACRYLIC TYPE ESTER/AMINO-STYRENE COPOLYMERS

Willard E. Catlin, Wilmington, Del., and Benjamin W. Howk, West Chester, Pa., assignors to E. I. du Pont de Nemours & Company, Wilmington, Del., a corporation of Delaware No Drawing. Application February 25, 1953, Serial No. 338,892

7 Claims. (Cl. 260—80.5)

This invention relates to polymeric materials. More particularly, it relates to novel copolymers peculiarly adapted for use as additives to oils of various types.

Polymeric materials of various types have achieved commercial success because of particular desirable characteristics which they possess. Since each type of polymer has individual properties and combinations of properties differing from other polymers, certain polymers have been found particularly useful in certain applications but not in others. Also in some applications the available polymeric materials are not entirely satisfactory and hence new polymers of improved properties in certain respects are desired.

This invention has as an object the preparation of new polymers. A further object is the preparation of new lubricating oil compositions. A further object is the preparation of new fuel oil compositions. Still another object is the preparation of new oil additives. Other objects will appear hereinafter.

These objects are accomplished by the present invention of primary amino nitrogen-containing copolymers of a plurality of polymerizable ethylenically unsaturated compounds, at least one of which is a primary aminostyrene, and at least one of which is an alkyl ester of an acid from the group consisting of acrylic and methacrylic acids, the alkyl groups in such esters containing from 8 to 20 carbon atoms inclusive, the copolymer containing from 0.1% to 4.5%, by weight, of primary amino nitrogen, and the total weight of the aminostyrene and long chain alkyl ester components amounting to at least 85% of the weight of the entire copolymer.

The copolymers as above defined have advantageous properties when used in coating compositions, adhesives, sizing agents, and the like, and further they are outstandingly adapted for use as additives to lubricating oils and fuel oils. When used as additives to lubricating oils, they have the extremely desirable property of greatly decreasing the change in viscosity of the oil with change in temperature. The copolymers of this invention are also effective lubricating oil detergents. When used as additives to fuel oils, they also have the extremely desirable property of improving the stability of such oils, especially catalytic cracked fuel oils. The copolymers of this invention are used as additives for oils in proportions of at least 0.001% of the weight of the oil. When used in fuel oils, proportions of from 0.001 to 0.1% are generally employed. However, when used in lubricating oils, the copolymers are used in proportions ranging from 0.1% to 10% by weight of the lubricating oil with proportions of from 0.2% to 5% giving best results.

The copolymers of this invention can be prepared by conventional methods of addition polymerization, e. g., bulk, solution, bead, and emulsion polymerization methods in the presence of an addition polymerization initiator. The polymerization is conveniently carried out by contacting a mixture of at least one primary aminostyrene, at least one alkyl ester of acrylic or methacrylic acid, the alkyl group in said ester containing from 8 to 20 carbon atoms inclusive, and, if desired, another polymerizable ethylenically unsaturated compound with from 0.1% to 10%, preferably 0.2% to 2%, of a free radical-liberating polymerization initiator. The proportions of these monomers are selected so that the copolymer obtained contains from 0.1% to 4.5% primary amino nitrogen and the total of the aminostyrene and alkyl ester of acrylic or methacrylic acid amounts to at least 85% of the finished copolymer. Examples of suitable initiators are peroxy compounds, e. g., benzoyl peroxide or di(tertiary amyl) peroxide, and azo initiators, e. g., 1,1′-azodicyclohexanecarbonitrile or $\alpha,\alpha'$-azodiisobutyronitrile. The polymerization can be carried out in the presence or absence of an inert solvent such as a hydrocarbon, e. g., benzene, white mineral oil, or lubricating oil, and preferably in an inert atmosphere, e. g., under a blanket of nitrogen. The mixture is maintained at a temperature at which the polymerization initiator generates free radicals rapidly. The exact temperature selected depends on the particular initiator being used. Temperatures ranging from room temperature or lower up to 150° C. or higher are suitable. It is usually desirable to carry the copolymerization substantially to completeness so that no unpolymerized monomers remain and the proportions of each component in the final product are essentially those of the original monomer mixture.

The following examples in which parts are by weight are illustrative of the invention.

EXAMPLE I

A mixture of 54 parts of technical grade lauryl methacrylate, 6 parts of p-aminostyrene, and 0.36 part of $\alpha,\alpha'$-azodiisobtyronitrile is heated for six hours at 60° C. in an atmosphere of oxygen-free nitrogen. In the early stages of the reaction stirring is effected by bubbling nitrogen through the polymerization mixture. The resulting product is a tacky, rubber-like copolymer of lauryl methacrylate and p-aminostyrene in the ratio of 90 parts to 10 parts by weight, containing about 1.15% primary amino nitrogen. The copolymer is colorless and somewhat translucent, and is easily soluble in kerosene.

EXAMPLE II

A mixture of 190 parts of technical lauryl methacrylate, 10 parts of p-aminostyrene, and 1.2 parts of $\alpha,\alpha'$-azodiisobutyronitrile is heated at 65° C. for six hours in an atmosphere of oxygen-free nitrogen. Stirring is effected by bubbling nitrogen through the solution. The resulting product is a highly viscous, somewhat rubber-like copolymer of lauryl methacrylate and p-aminostyrene in the proportions of 95 to 5, and contains about 0.6% amino nitrogen. This copolymer is easily soluble in fuel oil and in lubricating oils.

EXAMPLE III

A mixture of 38 parts of n-octyl methacrylate, 2 parts of p-aminostyrene, and 0.12 part of $\alpha,\alpha'$-diisobutyronitrile is heated at 65° C. for six hours in an atmosphere of nitrogen. The resulting product is a highly viscous and elastic copolymer of n-octyl methacrylate and p-aminostyrene in the proportions of 95 parts to 5 parts, and contains about 0.6% amino nitrogen. This copolymer is easily soluble in a solvent-extracted paraffin base lubricating oil.

EXAMPLE IV

A mixture of 38 parts of n-octyl acrylate, 2 parts of p-aminostyrene, and 0.12 part of $\alpha,\alpha'$-azodiisobutyronitrile is heated for six hours at 65° C. in an atmosphere of oxygen-free nitrogen. The resulting product is a copolymer of n-octyl acrylate and p-aminostyrene in the proportion of 95 parts to 5 parts. The copolymer is not sufficiently soluble to attain a 1.5% concentration in solvent-extracted paraffin base lubricating oil but is greatly swollen and so partially solvated by it.

EXAMPLE V

A mixture of 32 parts of technical lauryl methacrylate, 2 parts of p-aminostyrene, 6 parts of styrene, and 0.12 part of α,α'-azodiisobutyronitrile is heated at 65° C. for six hours in a nitrogen atmosphere. The resulting product is a highly viscous and elastic copolymer of lauryl methacrylate, p-aminostyrene, and styrene in the proportions 80:5:15 (by weight). This copolymer is easily soluble in solvent-extracted paraffin base lubricating oil.

The examples above are illustrative. The invention is generic to primary amino nitrogen-containing copolymers of a plurality of polymerizable ethylenically unsaturated compounds, at least one of which is a primary aminostyrene, i. e., a benzene having one primary amino, $NH_2$—, group and one vinyl, $CH_2=CH$—, group as substituents, preferably as its only substituents, and at least one of which is an alkyl ester of acrylic or methacrylic acid, the alkyl group in said ester containing from 8 to 20 carbon atoms inclusive, the copolymer containing from 0.1% to 4.5% of primary amino nitrogen and the combined weight of the aminostyrene and long-chain alkyl ester components amounting to at least 85% of the entire copolymer.

In addition to the specific copolymers illustrated in the examples, the following are typical copolymers of this invention well adapted for use in various applications such as additives to lubricating oils, additives to fuel oils, sizes, adhesives, and the like: n-decyl methacrylate/m-aminostyrene (65/35), n-octadecyl acrylate/p-aminostyrene/o-aminostyrene (80/10/10), n-tetradecyl acrylate/m-aminostyrene (85/15), 2-ethylhexyl methacrylate/m-aminostyrene (95/5), n-dodecyl methacrylate/p-aminostyrene/methyl methacrylate (85/5/10), n-dodecyl methacrylate/p - aminostyrene/o - aminostyrene (90/5/5), n-dodecyl methacrylate/p-aminostyrene/m-aminostyrene (90/5/5), n-eicosyl acrylate/m-aminostyrene (70/30), and 3,5,5-trimethylhexyl methacrylate/p-aminostyrene (95/5). Furthermore, the invention includes copolymers containing, in addition to the long-chain acrylates or methacrylates and the aminostyrenes, a small proportion of styrene, methyl methacrylate, or other copolymerizable ethylenic monomer in amounts up to 15% of the total weight of the copolymer. For example, other typical ethylenically unsaturated monomers which can be used as comonomers include ethylene, isobutylene, vinyl acetate, acrylonitrile, ethyl fumarate, butadiene, and the like. Other specific multi-component copolymers included in this invention are n-decyl methacrylate/o-amino-styrene/vinyl acetate (80/10/10) and lauryl acrylate/p-aminostyrene/o-aminostyrene/acrylonitrile (70/10/10/10).

The alkyl acrylate and methacrylate component, i. e., the alkyl ester of the acid

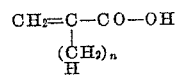

wherein $n$ is a cardinal number no greater than unity, i. e., up to 1, can be an ester of a pure alcohol or of technical alcohols having 8 to 20 carbon atoms. Alkyl acrylates and methacrylates derived from technical lauryl alcohol are especially preferred components of the copolymers of this invention. A technical lauryl alcohol commercially available (obtained by reduction of coconut oil fatty acids) which is especially suitable has the following approximate composition:

|  | Percent |
|---|---|
| $C_{10}H_{21}OH$ | 3 |
| $C_{12}H_{25}OH$ | 61 |
| $C_{14}H_{29}OH$ | 23 |
| $C_{16}H_{33}OH$ | 11 |
| $C_{18}H_{37}OH$ | 2 |

The lauryl esters of the examples are derived from technical lauryl alcohol of this composition. The technical alcohols made by the hydrogenation of carbon monoxide are also useful in making the copolymers of this invention.

The unique characteristics of the copolymers of this invention are clearly evident from tests of their usefulness as non-volatile organic additives to lubricating and fuel oils, e. g., from the carbon suspension test used in the lubricating oil field as a standard bench test to determine the detergent activity. This test demonstrates an unexpected and important quality of the copolymers of this invention. In this test, 30 grams of a carbon black is pebble-milled for 24 hours with sufficient refined white mineral oil to make a thin paste. Usually 300 to 400 grams of mineral oil is required. A 10-gram portion of the resulting paste is placed in a 4-ounce petroleum bottle, 0.2 gram of the particular polymer being tested (dissolved in kerosene) is added, the bottle filled to the shoulder with kerosene, the resulting suspension shaken well, and the rate of settling observed.

Table I below summarizes the results of this carbon suspension test carried out with two of the copolymers of this invention in comparison with a lauryl methacrylate homopolymer tested in the same way. The figures represent the per cent of the total volume of the test suspension in which settling is not visible after the period indicated.

TABLE I

*Carbon suspension test*

| Copolymer | Period of Observation, in hours | | | |
|---|---|---|---|---|
|  | 1 | 3 | 24 | 48 |
| Lauryl methacrylate/p-amino-styrene (90/10) | 100 | 100 | 100 | 100 |
| Lauryl methacrylate/p-amino-styrene (95/5) | 100 | 100 | 100 | 96 |
| Lauryl methacrylate (control) | 100 | 98 | 14 | |
| None (blank) | 27 | 19 | 14 | |

It will be observed that, with lauryl methacrylate homopolymer in solution, the settling rate of the suspension is slowed somewhat but is not arrested and after 24 hours the degree of suspension is no better than in the unmodified oil itself; whereas the lauryl methacrylate/aminostyrene copolymers containing 5 and 10% of the aminostyrene component permit only slight or no settling of the suspension after 48 hours.

The value of the copolymers of this invention as fuel oil stabilizers is shown by the results of an accelerated storage test carried out on samples of catalytically cracked fuel oil #2 distillate inhibited by incorporating therein small amounts of a typical copolymer. In this particular test, 10 cc. portions of the treated fuel oil contained in 20 cc. clear glass vented vials are exposed to indirect sunlight at room temperature. The samples are observed daily and the number of days required for the first appearance of haze and cloudiness in the oil represent the appearance of oil-insoluble products which is the first indication of sludge and precipitate formation in the oil. Table II below summarizes results of this test carried out with 0.005% of a lauryl methacrylate/p-aminostyrene (95/5) copolymer in comparison with the same concentration of a lauryl methacrylate/diethylaminoethyl methacrylate (80/20) copolymer (one of the copolymers included by U. S. application Ser. No. 281,047, filed April 7, 1952, by Catlin and Robbins).

TABLE II
Fuel oil stabilization

| Stabilizer | Conc., Percent | Days to first appearance of haze |
|---|---|---|
| None (control) | 0 | less than 4. |
| Lauryl methacrylate/p-aminostyrene (95/5) | 0.005 | 10. |
| Lauryl methacrylate/diethylaminoethyl methacrylate (80/20) | 0.005 | 11. |

These results indicate that the copolymers of this invention have fuel oil stabilizing activity similar to that of the basic copolymers of the aforementioned Catlin and Robbins application.

The aminostyrene/long-chain alkyl acrylate copolymers of this invention also possess characteristics which make them of great value as lubricating oil additives. In particular, these copolymers have activities as lubricating oil detergents which are superior to conventional additives employed in oils for passenger car service. These superior properties are shown by the results of a light-duty detergency characteristic test carried out in a Chevrolet engine according to the procedure CRC–FL–2–650 in Appendix E of the "Laboratory Engine Tests of Sulfur in Motor Gasoline—Field Test Fuels," January 1950, by the Coordinating Research Council, Inc. There are summarized in the following Table III the results of such tests carried out on an unmodified lubricating oil, an oil modified with conventional additives of the prior art, and oil modified with the long-chain acrylate/aminostyrene copolymers of this invention. The table also contains, for purposes of comparison, the results of the same tests on the same type of oil modified with a basic copolymer of the type disclosed in U. S. application Ser. No. 271,977, filed February 16, 1952, by W. E. Catlin. The oils tested (and referred to in Table III) have the following compositions:

Oil A—A Mid-Continent solvent extracted oil, SAE 20 grade, without additives.

Oil B—A commercial oil prepared from the same oil as Oil A except that it is SAE 30 grade. Conventional additives are present to enable the oil to pass performance specification MIL–D–2104.

Oil C—Oil A containing 0.5% lauryl methacrylate/p-aminostyrene (95/5) copolymer and 0.5% of a commercial antioxidant. The blend is SAE 30 grade.

Oil D—Oil A containing 0.5% lauryl methacrylate/diethylaminoethyl methacrylate (90/10) copolymer and 0.5% of the same antioxidant used in Oil C. Blend is SAE 30 grade.

Oil E—Same as Oil C except that 1% of lauryl methacrylate/P-aminostyrene (95/5) copolymer is used.

Oil F—Same as Oil D except that 1% of lauryl methacrylate/diethylaminoethyl methacrylate (90/10) copolymer is used.

TABLE III
Detergent activity of lubricating oils

| Oil | Varnish Score | | | Total Sludge Score |
|---|---|---|---|---|
|  | First Piston | Average Piston | Total |  |
| A | 3.5 | 5.3 | 29 | 32 |
| B | 4.0 | 6.5 | 34 | 40 |
| C | 5.5 | 6.8 | 37 | 43 |
| D | 6.5 | 8.5 | 40 | 41 |
| E | 6.0 | 8.2 | 35 | 44 |
| F | 8.0 | 9.3 | 42 | 41 |

The results in Table III clearly show that the activity of the aminostyrene copolymers of this invention is similar to that of the basic polymers of Catlin, Ser. No. 271,977, and is superior to conventional additives from the stand-point of detergency characteristics under light-duty conditions. This ability in an additive to greatly improve the detergent activity of the lubricating oil composition is highly significant in developing superior quality lubricating oils. A major problem in the operation of both spark ignition and diesel engines results from the tendency of conventional crankcase oils to undergo oxidation and other chemical changes that lead to the formation of carbon, resins, and insoluble varnish-like gums. These products deposit on moving engine parts and separate as sludge that markedly impairs the lubricating properties of the oil. A major contribution to the sludge may also arise from decomposition of the fuel. Deposition of sludge on piston surfaces and around piston rings is particularly damaging. It is known that sludge formation and gum deposition are especially severe in light-duty engine operation as exemplified by intermittent use of passenger automobiles and light trucks. It is thus evident from tha results summarized in Table III that the aminostyrene copolymers of this invention are highly effective in increasing the detergant activity of lubricating oils.

The copolymers of this invention when added to lubricating oil compositions improve the lubricating characteristics in still another important respect. They are highly effective in reducing the change in viscosity of the oil with temperature and this is a very desirable property in a lubricant additive. A measurement of the suitability of a lubricating oil for use over a wide range of operating temperatures is afforded by the slope of the curve showing the effect of the additive on the viscosity-temperature characteristics of the oil. This slope value is calculated by dividing the viscosity increase produced by the additive in the oil at 100° F. by that at 210° F. More particularly, the slope value is calculated from the observed viscosities, in centistokes, of the unmodified base oil and the oil solution of the copolymer by means of the following equation:

$$\text{Slope} = \frac{\text{Solution of viscosity at } 100°\text{F.} - \text{base oil viscosity at } 100°\text{ F.}}{\text{Solution of viscosity at } 210°\text{F.} - \text{base oil viscosity at } 210°\text{ F.}}$$

In this test, oil compositions having the lowest slope values exhibit the least change in viscosity with change in temperature, and an additive which will decrease this characteristic slope by 0.5 unit is regarded as a significant discovery.

The effectiveness of the p-aminostyrene/long-chain alkyl acrylate and methacrylate copolymers of this invention in reducing the change in viscosity with increase in temperature of lubricating oils is shown by the following Table IV. This table summarizes the measured viscosities of a solvent-extracted paraffin base lubricating oil, the same oil containing 1.5% of a lauryl methacrylate/p-aminostyrene (95/5) copolymer as additive, and the same oil containing the same proportion of lauryl methacrylate homopolymer (a conventional oil additive), and the calculated slopes of these two modified oils. These data show the very marked superiority of the lauryl methacrylate/p-aminostyrene copolymer over the lauryl methacrylate homopolymer.

TABLE IV
Viscosity characteristics of solvent-extracted paraffin base lubricating oils

| Additive | Concentration Percent of Oil | Viscosity of Oil in Centistokes | | Slope |
|---|---|---|---|---|
|  |  | at 100° F. | at 210° F. |  |
| None (control) | 0 | 46.71 | 6.52 | ------ |
| Lauryl methacrylate/p-aminostyrene (95/5) | 1.5 | 50.27 | 7.58 | 3.36 |
| Lauryl methacrylate | 1.5 | 62.92 | 9.04 | 6.4 |

The marked superiority of copolymers included by this invention over closely related known polymers of the art is quite evident when certain of their properties are compared. For example, a copolymer of methyl methacrylate and p-aminostyrene in the ratio of 95/5 by weight, and a copolymer of styrene, methyl methacrylate and p-aminostyrene in the ratio of 75/20/5 by weight are both insoluble in kerosene and lubricating oil at room temperature and at 100° C. Consequently, these polymers are not suitable for use as oil additives.

Although particular advantages of the copolymers of this invention have been emphasized in connection with their use as additives to fuel oils and lubricating oils, the copolymers of this invention are also useful in other applications. For example, they are especially useful as sizing agents for paper and as adhesives for nylon tire cords.

In the various applications for which the polymers of this invention are adapted, the copolymers which are most effective for one specific use will not necessarily have the same proportions of aminostyrene and long-chain alkyl acrylate or methacrylate component or the same chain length in the ester component. For example, those copolymers of this invention having substantial solubility in lubricating oils and fuel oils are the ones which are effective oil additives. On the other hand, solubility in such oils is not required for other applications such as sizing agents for paper. With respect to the specific use of aminostyrene/long-chain acrylate or methacrylate copolymers as oil additives, the copolymers containing the larger proportions of the aminostyrene component or the shorter chain alkyl groups, i. e., those of 8 to 10 carbon atoms, in the acrylate or methacrylate component are less soluble in lubricating oils than the others. Thus, copolymers of alkyl acrylates or methacrylates in which the alkyl groups contain 12 to 20 carbon atoms, with primary aminostyrenes in such proportions that the copolymer contains from 0.2% to 2.0% of primary amino nitrogen, are preferred for use as oil additives.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A copolymer of lauryl methacrylate with p-aminostyrene, said copolymer containing 0.1 to 4.5%, by weight, of primary amino nitrogen and having at least 85%, by weight, of said copolymer, of the recited components and not more than 15%, by weight of said copolymer, of another addition copolymerizable ethylenic monomer component.

2. A copolymer of an ester

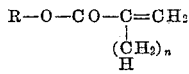

wherein $n$ is a cardinal number up to one and R is an alkyl group of 8 to 20 carbons, with a primary aminostyrene having the primary amino, —NH$_2$, group and the vinyl, CH$_2$=CH—, group as substituents on a benzene ring, said copolymer containing, in combination, at least 85%, by weight, of said ester and aminostyrene components, not more than 15%, by weight of said copolymer, of another addition copolymerizable ethylenic monomer component, and from 0.1% to 4.5%, by weight, of primary amino nitrogen.

3. A copolymer of a primary aminostyrene having the primary amino, —NH$_2$, group and the vinyl, CH$_2$=CH—, group as substituents on a benzene ring with an alkyl ester of an alpha-methylene alkanoic acid, said acid having from three to four carbons and being esterified with an alkanol of twelve to twenty carbons, said copolymer containing, in combination, from 0.2 to 2.0%, by weight, of primary amino nitrogen and at least 85%, by weight, of said aminostyrene and said ester and not more than 15%, by weight of said copolymer, of another addition copolymerizable ethylenic monomer component.

4. A copolymer of n-octyl methacrylate with p-aminostyrene, said copolymer containing 0.1 to 4.5%, by weight, of primary amino nitrogen and having at least 85%, by weight, of said copolymer, of the recited components and not more than 15%, by weight of said copolymer, of another addition copolymerizable ethylenic monomer component.

5. A copolymer of n-octyl acrylate with p-aminostyrene, said copolymer containing 0.1 to 4.5%, by weight, of primary amino nitrogen and having at least 85%, by weight, of said copolymer, of the recited components and not more than 15%, by weight of said copolymer, of another addition copolymerizable ethylenic monomer component.

6. A copolymer of lauryl methacrylate with p-aminostyrene, said copolymer containing 0.1 to 4.5%, by weight, of primary amino nitrogen and having at least 85%, by weight, of said copolymer, of the recited components and not more than 15%, by weight of said copolymer, of styrene.

7. A copolymer of an ester

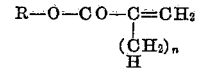

wherein $n$ is a cardinal number up to one and R is an alkyl group of 8 to 20 carbons, with p-aminostyrene, said copolymer containing, in combination, at least 85%, by weight, of said ester and aminostyrene components, not more than 15%, by weight of said copolymer, of another addition copolymerizable ethylenic monomer component, and from 0.1% to 4.5%, by weight, of primary amino nitrogen.

References Cited in the file of this patent

UNITED STATES PATENTS

| | | |
|---|---|---|
| 2,366,517 | Gleason | Jan. 2, 1945 |
| 2,387,501 | Dietrich | Oct. 23, 1945 |
| 2,584,968 | Catlin | Feb. 12, 1952 |
| 2,613,184 | Catlin | Oct. 7, 1952 |